(No Model.)
C. HERING.
SECONDARY BATTERY.
No. 429,913. Patented June 10, 1890.
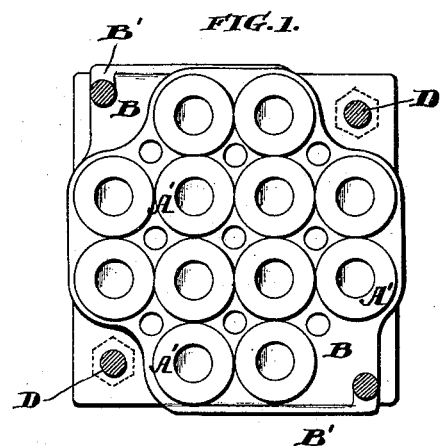
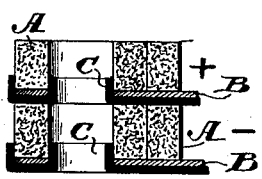
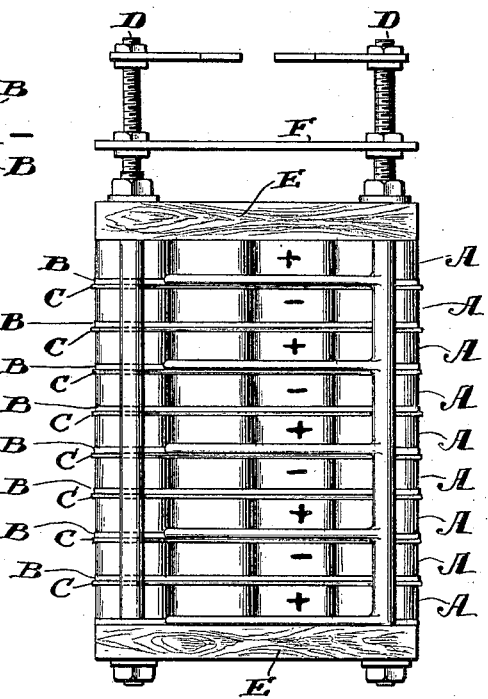
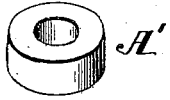
WITNESSES:
INVENTOR:

UNITED STATES PATENT OFFICE.

CARL HERING, OF PHILADELPHIA, PENNSYLVANIA.

SECONDARY BATTERY.

SPECIFICATION forming part of Letters Patent No. 429,913, dated June 10, 1890.

Application filed April 15, 1890. Serial No. 347,943. (No model.)

*To all whom it may concern:*

Be it known that I, CARL HERING, a citizen of the United States of America, residing at Philadelphia, in the county of Philadelphia and State of Pennsylvania, have invented certain new and useful Improvements in Secondary Batteries, of which the following is a specification, reference being had therein to the accompanying drawings.

My invention relates to the construction of a secondary-battery cell.

The object of my invention is so to construct and connect the plates of such a battery that they shall not touch each other, that they shall not buckle, that the active material shall not detach itself from the conductor, and that the plates may expand and contract without influencing the conductors, and that the most rapid action possible may be enabled; and my invention consists in a construction and combination of the parts of a secondary-battery cell whereby these results are attained, as hereinafter specified. The chief faults of an ordinary accumulator consisting of a grid pasted with the active material are caused by the fact that the active material expands and contracts during charge and discharge, while the metallic conductor to which it is applied remains rigid, with the result that in the expansion of the material the plate buckles and changes its shape, and in contracting it loosens its hold upon the conducting-grid and falls out or becomes partially insulated by being separated from its conductor by a layer of sulphate which forms between the conductor and the active material when the contact is not good. Another fault is that, owing to the above or other reasons, an ordinary accumulator cannot be charged or discharged rapidly without buckling or short-circuiting or falling out of the active material or otherwise becoming damaged. I make each of the working-plates of a number of small perforated homogeneous sections of active material, preferably in the form of flat rings, although they may be of other form, but of whatever form having spaces between the sections in addition to the holes in them.

Referring to the accompanying drawings, Figure 1 is a horizontal section of a block, as herein described, showing a composite plate. Fig. 2 is an elevation of same. Fig. 3 is a flat ring of active material, and Fig. 4 shows the flanged perforation in the non-conducting sheets.

A A are composite plates of active material formed of sections A'.

B B are conducting-sheets.

B' B' are rheophores.

C C are non-conducting sheets.

D D are bolts clamping together the pile by means of the plates E, of material mechanically strong.

F forms the lid to the cell.

In the construction of my pile I generally first place on the bottom a plate of mechanically-strong material, and on this place a course of these sections, although this plate may be dispensed with and the sections may be placed on the bottom of the cell, or a sheet of conducting material may be placed on the bottom of the cell and the course of sections placed upon it. Such course of perforated sections becomes in effect a composite plate and hereinafter will be so designated. In each such composite plate the relative positions of the sections are the same, so that the holes in the sections and the spaces between them are respectively in line one with the other in the different composite plates. On one or each of the surfaces of each such composite plate I place a sheet of lead or other conducting material with a rheophore to lead off the current from that plate. These composite plates, with their conductors, are respectively separated from adjacent composite plates of opposite polarity by sheets of non-conducting material (porous or not)—such as celluloid, porous porcelain, or the like—so that a conducting-sheet is in contact with each composite plate and a non-conducting sheet is between every two adjacent composite plates of different polarity.

The series of composite plates, conducting-sheets, and non-conducting sheets is placed between two mechanically-strong plates, which are drawn or pressed together by bolts or other means, leaving the pile solid and forming of it practically an integral block.

The charge and discharge of plates take place chiefly on the edges.

To facilitate the charge and discharge, the non-conducting sheets are made with holes corresponding to the holes in the sections of the composite plates and with holes also corresponding to the spaces between the sections in position, but smaller and preferably cupped or flanged. These sheets are also made larger than the course of sections and are preferably turned up on their edges. By this means the sections of active material are held in proper position while the block is being assembled and afterward until they have formed an adhesion to the conducting-sheets, one or more of which are placed in contact with each composite plate, and which are also preferably perforated similarly to the non-conducting sheets. Positive and negative composite plates may be alternated with a conducting-sheet in contact with each and a non-conducting sheet between them, or the positive and negative composite plates may be respectively in pairs, with a conducting-sheet between them and a non-conducting sheet between the pairs.

I claim as my invention—

1. In a secondary battery, a series of alternate composite plates or layers of active material having a conducting-sheet in contact with each composite plate or layer and a non-conducting sheet between each two adjacent composite plates or layers of different polarity, such composite plate or layer being composed of a number of flat rings approximately juxtaposed, the corresponding rings in all the layers being in line with each other.

2. In a secondary battery, a series of alternate composite plates or layers of active material having a conducting-sheet in contact with each composite plate or layer and a non-conducting sheet between each two composite plates or layers of different polarity, each such composite plate or layer being composed of a number of perforated sections.

3. In a secondary battery, a series of alternate composite plates or layers of active material having a conducting-sheet in contact with each composite plate or layer and a non-conducting sheet between each two composite plates or layers of different polarity, each such composite plate or layer being composed of a number of perforated sections and having spaces between the sections, and said sheets having perforations corresponding to the holes in and the spaces between the sections, the perforations in the non-conducting sheets being smaller than the holes in and spaces between the sections and being cupped or flanged, so as to hold said sections properly in position.

In testimony whereof I have affixed my signature in presence of two witnesses.

CARL HERING.

Witnesses:
GEORGE HOUSE,
G. MORGAN ELDRIDGE.